United States Patent [19]
Galian et al.
[11] 3,777,065
[45] Dec. 4, 1973

[54] CALLING SYSTEM UTILIZING A TELEPHONE

[75] Inventors: John N. Galian, Woodbury; Ernest W. Karkut, Bridgeport, both of Conn.

[73] Assignee: Total Systems Corp., Fairfield, Mass.

[22] Filed: June 30, 1971
(Under Rule 47)

[21] Appl. No.: 158,243

[52] U.S. Cl. ............ 179/6 TA, 179/2 R, 179/2 TC, 179/6 C
[51] Int. Cl. H04m 3/42, H04m 11/00, H04m 11/02
[58] Field of Search .................... 179/6 R, 6 C, 6 D, 179/6 TA, 2 TC, 2 R

[56] References Cited

UNITED STATES PATENTS 3,046,339 7/1962 Breen et al. ...................... 179/2 TC
2,901,542 8/1959 Henches et al. .................. 179/6 TA
3,393,272 7/1968 Hanson ............................ 179/2 TC

FOREIGN PATENTS OR APPLICATIONS 1,172,166 11/1969 Great Britain .................... 179/2 TC

*Primary Examiner*—Raymond F. Cardillo, Jr.
*Attorney*—Johnson & Kline

[57] ABSTRACT

A calling system for use in a hotel or the like having a plurality of rooms each with a telephone connected to a telephone substation for enabling a telephone operator to ring the telephone to awaken the guest, have an audio pre-recorded message played to the guest when the telephone is answered and provide a visual indication that the telephone has been answered. The system may also have an automatic calling switch which is presettable.

9 Claims, 3 Drawing Figures

INVENTORS
John N. Galian
BY Ernest W. Karkut
Johnson and Kline
ATTORNEYS

INVENTORS
John N. Galian
BY Ernest W. Karkut
Johnson and Kline
ATTORNEYS

CALLING SYSTEM UTILIZING A TELEPHONE

In most hotels, it is common for a guest to request that he be awakened by the innkeeper at a selected time and usually this has heretofore been accomplished by the hotel telephone operator calling the guest room at the selected time. While such a procedure has been found operative it has not been found completely satisfactory. One difficulty arises when the operator has a number of rooms desiring to be called at the same time but as each call requires the operator's undivided personal attention, the time when a call may be made by the operator may widely depart from the guest's selected time. Another difficulty with the heretofore known operator calling system is that in many instances even if a call has been made, the guest may assert that the call was not made and the hotel would not be provided with proof that the call was made with which to rebut the assertion.

It is accordingly an object of the present invention to provide a calling system for use in a hotel or the like which overcomes the above-noted deficiencies in the presently utilized practice and still enable an operator to monitor each call.

Another object of the present invention is to achieve the above object with a calling system which may be economically manufactured and yet easily and effectively installed in a hotel telephone system, either simultaneously with or subsequent to installation of the telephone system.

A further object of the present invention is to provide a calling system which requires only momentary attention on the part of the operator to effect a call either simultaneously with the call or to program the call for the desired time to have the call energize the telephone bell until the guest answers the telephone, to have a recorded audio message delivered to the guest when the telephone is answered and to provide proof that the call has been completed upon the guest replacing the telephone receiver.

In carrying out the present invention, the calling system is designed to be incorporated into a hotel or the like telephone system wherein each room is provided a telephone and the hotel has a telephone substation. Each telephone is connected to the substation by a pair of telephone wires and the calling system includes a calling unit that is inserted in the telephone wires to control connection of the telephone wires to the substation or to the calling system. When connected to the latter the telephone bell may be rung and an audio message played when it is answered.

The calling system further includes a pair of indicating means specifically two light bulbs together with an actuating switch and a cancelling switch and these four elements may be placed in a panel adjacent the operator for convenient use. Accordingly, the installation of the calling system only requires the insertion of the calling unit in the telephone wires for each room plus the installation of a panel having the two indicator means and two switches for each room together with a centralized power unit, audio message means and telephone bell energizing circuit.

In use the operator momentarily actuates the actuation switch which effects disconnection of the telephone wires from the telephone substation and interconnects them with a bell energizing source to effect ringing of the telephone in the guest's room associated with the actuating switch. In addition, a first condition of the indicating means is established to enable the operator to know that the guest's telephone is being rung so that the call can be monitored. Upon the guest removing the telephone hand set from the receiver, the audio message means is interconnected to the telephone to play a recorded message to the guest and during the time that the guest is answering the telephone a second indication is provided by the indicating means to enable the operator to know that the guest has answered the call. When the guest has placed the telephone hand set on the receiver, the calling unit reconnects the telephone wires to the telephone substation and provides a third condition of the indicating means so that the telephone may now function in its normal manner but yet there is provided for the operator an indication that the call has been made and that the guest has answered the telephone. The indication remains energized until generally a substantial time later, when it may be deenergized by momentary actuation of the cancelling switch.

A further feature of the present invention resides in a presettable switch which automatically calls the guest at the selected time and thus does not require the attention of the operator at the time of calling. The switch is preset for each room for the time of the call preferably when the guest requests the call. An automatic timer then actuates the calling unit at the preset time.

Other features and advantages will hereinafter appear.

Referring to the drawing.

Figures 1, 2:
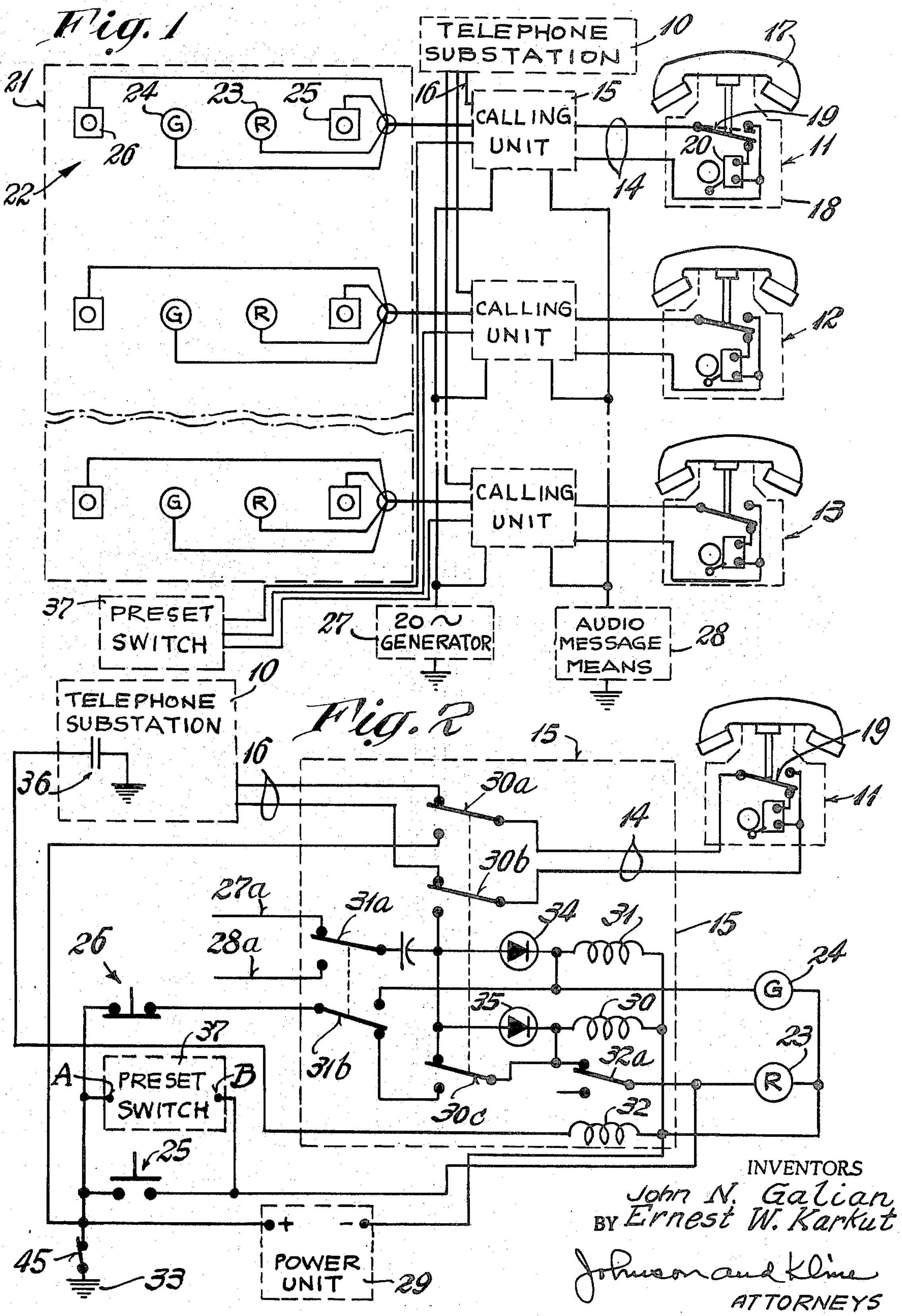
FIG. 1 is a pictorial illustration showing the interconnection of the various components of the calling system of the present invention for a plurality of rooms.
FIG. 2 is an electrical schematic diagram of one of the calling units shown in block form in FIG. 1.

In the drawing the telephone substation is generally indicated by the reference numeral 10 and is of conventional design enabling an operator to have telephonic communication with a guest room in which a telephone, such as a telephone 11 is located. It is contemplated that there will be a plurality of rooms, perhaps hundreds with each having a telephone and as representative thereof, telephones 12 and 13 are shown. Referring specifically to the telephone 11 it has a pair of telephone wires 14 that are connected to a calling unit 15 with the latter also having connected thereto wires 16 from the telephone substation. In normal use the wires 16 are connected by the calling unit 15 to the wires 14 so that the telephone 11 is connected in its usual manner for telephonic communication. Each of the other telephones is similarly connected to the substation 10 through its own calling unit for identical operation.

Each telephone 11, 12 and 13 is of conventional design and again referring to the telephone 11 it is typically shown as having a receiver 17 removably mounted on a base 18 with the receiver when on the base, positioning a two position switch 19 in the solid line position shown wherein the switch connects the telephone wires 14 to a bell 20. With the receiver being lifted from the base, switch 19 assumes its dotted line position to connect the telephone wires 14 to the ear and mouthpiece of the receiver 17.

Located adjacent the telephone substation to enable convenient use by an operator though if desired it may be located elsewhere for operation by another employee, is a panel 21 having a horizontal row 22 for each of the telephones. Each row includes a pair of indicating elements such as a red bulb 23 and a green bulb 24 together with a pair of push button switches 25 and 26 with the switch 25 being normally open and preferably designated the actuating switch while the switch 26 is normally closed and designated the cancelling switch.

The system further includes a 20 cycle generator 27 which supplies pulsating power for effecting the intermittent energization of the bell 20 and an audio message means 28 that provides a continuously repeated audio message and consists simply of a tape recorder with the audio message being on a continuously run tape. Both the 20 cycle generator and the audio message means are connected to each of the calling units 15 and thus only one in each system is generally required.

Referring to FIG. 2 there is shown the electrical schematic diagram of a calling unit 15. The telephone wires 16 and 14 are shown together with the telephone 11, wire 27*a* to the 20 cycle generator, wire 28*a* to the audio message means, actuating switch 25, cancelling switch 26, and the two indicating lights 23 and 24. In addition the system includes a power unit 29 for supplying D.C. energization for the units. Within the calling unit 15 there is provided a first relay coil 30 having contact arms 30*a*, 30*b* and 30*c*; a second relay coil 31 having contact arms 31*a* and 31*b* and a third relay coil 32 having a contact arm 32*a*. Each of the contact arms is shown in its solid line position as it would be with its relay coil deenergized.

In the operation of the calling system when it is desired to ring the telephone 11 in the guest room at the selected time to awaken the guest, the actuating switch 25 is momentarily depressed and then released. This energizes the relay coil 30 through the contact arm 32*a* and also energizes the red light 23. The contact arms 30*a*, 30*b* and 30*c* will assume their opposite positions to establish a holding circuit for the relay coil 30 through the cancelling switch 26, contact arm 31*b* and contact arm 30c while the red light 23 is also maintained energized through contact arm 32*a*. The 20 cycle generator wire 27*a* is connected through the contact arms 31*a* and 30*b* and the telephone wires 14 to effect ringing thereof with the return to a positive ground 33 being through the contact arm 30*a*. The telephone will thus be energized with intermittent current and the telephone wires 14 are disconnected from the telephone substation by contact arms 30*a* and 30*b* until the guest removes the receiver 17 from its base 18 which effects shifting of the position of the switch 19.

Upon the guest answering the telephone, the relay coil 31 becomes energized by a path through the contact arm 30*a*, the switch 19, contact arm 30*b* and a diode 34. In addition the energization of the relay 30 is maintained by the same path except through a diode 35 which also maintains the red light 23 energized through contact arm 32*a*. The contact arms 31a and 31*b* when assuming their energized position break the previously mentioned holding circuit for the relay coil 30 and light 23. The green light 24 is also energized through a path that includes the cancelling switch 26 and contact arm 31*b*. In addition the audio message means 28 is connected to the telephone wires by contact arms 31*a*, 30*b* and 30*a* to cause the audio message to be transmitted to the telephone receiver. The operator may thus determine that the telephone is being answered by both lights 23 and 24 being energized, a second condition of the indicating means.

Upon the guest replacing the receiver 27 on the base 18, the switch 19 is forced to its solid line position which breaks the energizing path through the diodes 34 and 35 to the relay coils 31 and 30 and the red light 23. However, the relay coil 31 is maintained energized through a holding circuit that includes the cancelling switch 26 and contact arm 31b and coil 31 which, in addition maintains the green light 24 energized. The deenergization of relay coil 30 causes the arms 30a and 30b to reconnect the telephone wires to the telephone substation 10 and also deenergizes red light 23. However, as just the green light 24 is energized the operator is provided with a third condition of the lights 23 and 24. The circuit may be maintained in this state wherein the telephone is connected in its normal manner to the telephone substation and the light 24 is energized for as long as it is desired to provide proof that a call had been made to the telephone 11. Accordingly, sometime later the operator may deenergize the light 24 simply by momentarily opening the cancelling switch 26 which breaks the circuit through the relay coil 31 and causes the contact arms 31*a* and 31*b* to assume their solid line position. This causes the light 24 to become deenergized.

In the event that the guest is utilizing the telephone 17 when the operator presses the actuating switch 25 to call the room, a circuit is established through a closed busy signal switch 36 in the substation which energizes the relay coil 32 causing the switch arm 32*a* to shift its position. This prevents energization of the relay coil 30 and also prevents the energization of the light 23 indicating to the operator that the telephone is in use and that the call should be attempted again when the guest replaces the telephone on its base.

Figure 3:
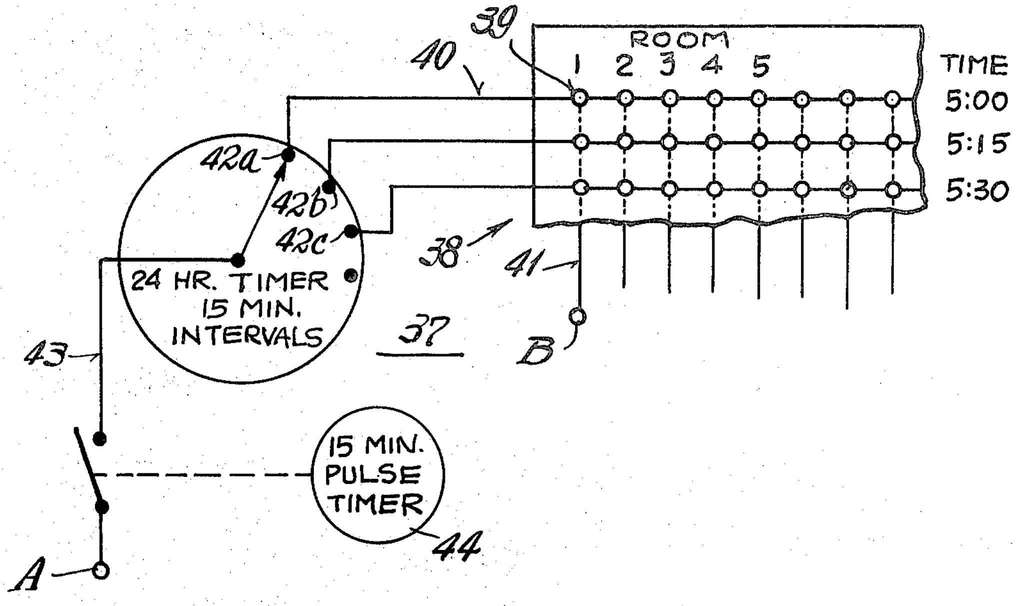
FIG. 3 is a representation of a presettable switch which may be incorporated in the present calling system.

Shown in FIG. 3 is a preset switch 37 which may be used with the heretofore described calling system. The switch 37 is designed to be connected in parallel to the calling switch 25 for each room and hence has two terminals A and B common to the switch 37 and the calling switch. The switch 37 includes a two plate matrix board 38 of the captive pin type with a plurality of pins 39 indicated by a circle in the drawing. Similar circles on one plate are connected in horizontal rows and designated time with a lead 40 extending from each row. Similar circles on the other plate are connected in vertical rows designated room with each vertical row having a lead 41. Each lead 41 is connected to a terminal corresponding to the terminal B of calling unit 15 (as indicated by the letter B). The switch 37 further includes a 24 hour timer 42 having output terminals 42*a*, 42*b*, 42*c*, etc., with the timer connecting an input lead 43 to one of the output terminals for a selected period, such for example, 15 minutes. The lead 43 is connected through a 15 minute pulse timer 44 to the terminal A which is effectively the positive ground 33.

In the operation of the switch 37, the pins in the matrix 38 normally do not effect connection between the two plates until manually forced to a connecting position. Upon a guest requesting a call at a selected time, the operator actuates the one pin which is both in the vertical row corresponding to the guest's room number and in the horizontal row corresponding to the selected time. Upon the timer connecting the input lead 43 to the one output terminal (42*a*, 42*b*, 42*c*) which is the time selected there is a connection between the timer output terminal and the room lead, such as lead 41. Sometime during the interval of this connection, the switch of pulse timer 44 is closed for a short duration. This simulates momentary actuation of the calling switch 25 and effects operation of the calling unit associated therewith.

The matrix board 38 is commercially available under the trade name "Selectroboard." While a specific time interval of 15 minutes has been shown, it will be understood that a different interval such as 10 minutes may be used if desired.

Irrespective of whether the preset switch 37 or the calling switch is used to initiate the call, the operator may still monitor the call by observing the red light 23. Thus, if the light remains on for an extended period, indicating that the guest is not answering, the operator may assume that the guest's room may require investigation. Also the call may be discontinued by the operator by pressing the cancelling switch 26.

If desired, all green lights may be cancelled simultaneously by a switch 45 connected in the positive lead. Momentary opening of this switch deenergizes the relay coil 31 in each calling unit to thereby return the calling units to their deenergized state ready for the next call. Also, at the same time, each of the pins in the preset switch may be returned to their normal disconnected position to condition the switch for subsequent operation.

It will accordingly be appreciated that there has been disclosed a calling system which may be incorporated into a telephone system to enable an operator to call any one of the telephones simply by momentary actuation of a switch or by use of a preset switch. The switch effects ringing of the telephone and provides the operator with an indication thereof. The guest in answering the call removes the telephone receiver from its base which provides both a second indication to the operator and also enables an audio message to be transmitted to the guest. Upon completion of the message, effected by the guest replacing the receiver on the telephone base, the system again interconnects the telephone through the telephone substation for use in its normal manner and also provides a third indication to the operator of the replacement of the receiver. The third indication is maintained for as long as it is desired to provide proof of the occurrence of a call and may be cancelled simply by momentary actuation of the cancelling switch. It will be understood that with the system as hereinbefore disclosed that the light 24 which provides proof that a call had been made is incapable by the operator of being actuated and that it requires that the guest remove the receiver 17 from its base and replace it before the proof light 24 becomes energized.

Variations and modifications may be made within the scope of the claims and portions of the improvements may be used without others.

We claim:

1. A calling system for use with a telephone connected to a telphone substation by telephone wires and where the telephone has a manually operated switch which in one position is adapted to connect the telephone for telephonic communication and in a second position to connect the telephone to a calling signal means, said calling system comprising:

A. Actuation means for actuating said calling system;
B. Calling signal means;
C. Means for providing energization to the calling signal means;
D. Audio communication means;
E. First and second indicator means each adapted to have different energized conditions for indicating together three different conditions; and
F. Circuit means including:
   *i.* Means for initially disconnecting the telephone wires from the substation and connecting them to said calling system upon actuation of said actuation means and to said means providing energization to the calling signal means and whereby energization of the calling signal means will energize said first indicator means to indicate one condition when said manually operated switch is in its one position;
   *ii.* Means for disconnecting said telephone wires from said calling signal means and connecting them to said audio communication means and causing and maintaining energization of said second indicator means for indicating a second condition when said manually operated switch is in its second position; and,
   *iii.* Means for disconnecting said telephone wires from said audio communication means and connecting them to said substation and deenergizing said first indicator means while maintaining energization of said second indicator means to indicate a third condition when said manually operated switch is returned to its one position.

2. A calling system according to claim 1 wherein each said indicating means comprises an electric light.

3. A calling system according to claim 1 wherein the actuating means comprises a momentarily actuatable switch and wherein said circuit means includes a holding circuit for maintaining the same effect as continued actuation of said actuatable switch during the time said calling system is connected to the telephone wires.

4. A calling system according to claim 1 wherein the circuit means includes an actuation cancelling switch actuation of which deenergizes the second indicator means.

5. A calling system according to claim 1 wherein the circuit means includes sensing means for sensing the manually operated switch being in its second position simultaneously with the actuation of the actuating means and by which the circuit means is prevented from disconnecting the telephone wires from the telephone substation.

6. A calling system according to claim 1 in which there are a plurality of telephones connected to the telephone substation, in which there is a calling system for each telephone and in which the audio communication means is common to each calling system.

7. A calling system according to claim 6 including in addition preset switch means for selecting any one of a plurality of times for actuating each calling system.

8. A calling system according to claim 7 wherein the preset switch means includes a timer for effecting an interconnection between an input and any one of the plurality of outputs with the timer sequentially shifting the interconnection from one output to another output after a selected time interval.

9. A calling system according to claim 7 wherein said preset switch means includes a plurality of leads with each said lead adapted to contact with a calling system.

* * * * *